United States Patent [19]

Merritt

[11] Patent Number: 5,333,407
[45] Date of Patent: Aug. 2, 1994

[54] LIVE BAIT FISH HOOK

[76] Inventor: Selma J. Merritt, 489 Waccamaw Shores Rd., Lake Waccamaw, N.C. 28450

[21] Appl. No.: 85,075

[22] Filed: Jul. 2, 1993

[51] Int. Cl.$^5$ .............................................. A01K 83/06
[52] U.S. Cl. ........................................ 43/44.4; 43/44.8
[58] Field of Search ...................... 43/44.4, 44.8, 44.2, 43/44.83, 44.85, 44.6, 44.84, 41

[56] References Cited

U.S. PATENT DOCUMENTS

| | | | |
|---|---|---|---|
| 615,170 | 11/1898 | Henckler | 43/44.4 |
| 797,161 | 8/1905 | West | 43/44.4 |
| 1,613,113 | 1/1927 | Leo | 43/44.4 |
| 1,993,582 | 3/1935 | Anderson | 43/44.4 |
| 2,143,054 | 1/1939 | Copeland | 43/44.4 |
| 2,531,995 | 11/1950 | Sweetman | 43/44.8 |
| 2,974,436 | 3/1961 | Gourlay | 43/44.8 |
| 2,982,049 | 5/1961 | Yost | 43/44.4 |
| 3,197,912 | 8/1965 | Kramer | 43/44.4 |
| 3,368,299 | 2/1968 | Scheidt | 43/44.83 |
| 3,372,508 | 3/1968 | Maglinger | 43/44.4 |
| 4,229,901 | 10/1980 | Flowers | 43/44.8 |

*Primary Examiner*—P. Austin Bradley
*Assistant Examiner*—James Miner
*Attorney, Agent, or Firm*—Donald A. Kettlestrings

[57] ABSTRACT

A fish hook for live bait includes a coil spring axially positioned on the fish hook shank. One end of the spring is fixedly attached to the shank adjacent to a barbed end of the hook, and the other end of the spring can be slideably moved along the shank as the spring is compressed and released. A flexible line is positioned axially within the spring and defines a looped end which is positioned adjacent to the barbed end of the hook. The looped end grasps and holds the bait adjacent to the barbed end and in an orientation which enables the bait to be in alignment with the shank. The positioning and orientation of the live bait with respect to the barbed end of the hook enables the bait to move in a natural manner during trolling and provides the hook with the characteristic of being weedless.

7 Claims, 3 Drawing Sheets

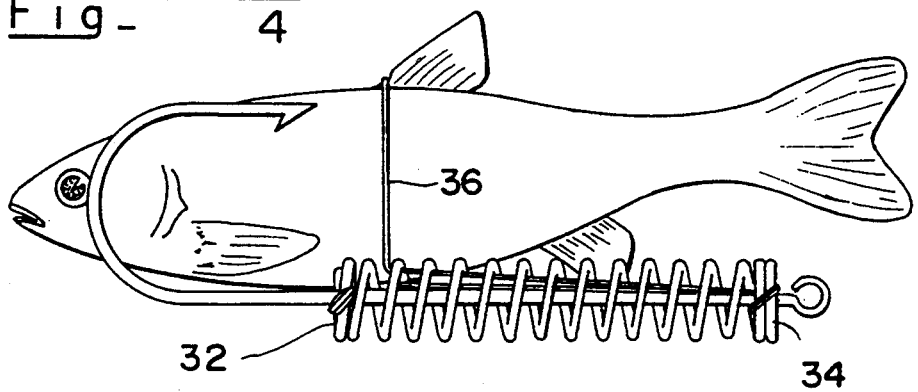
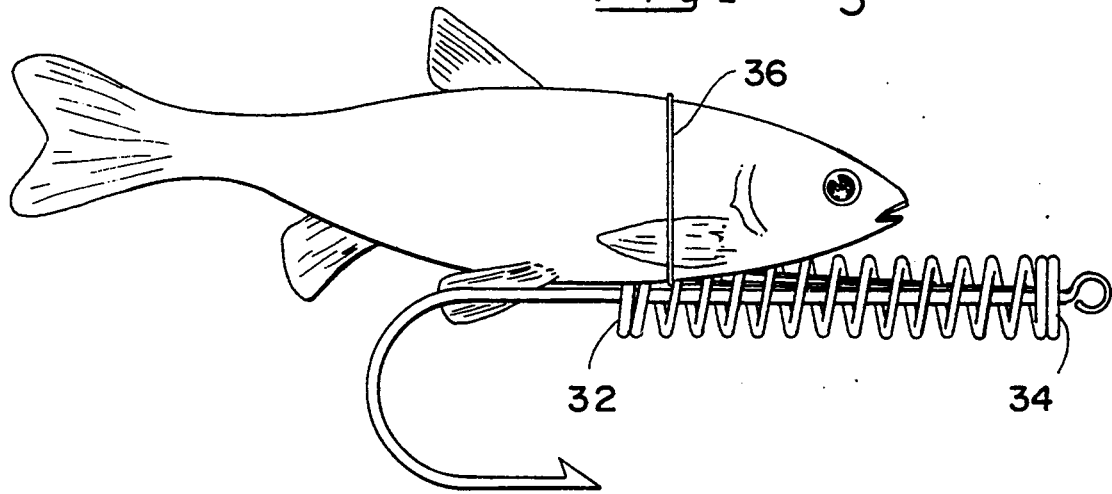
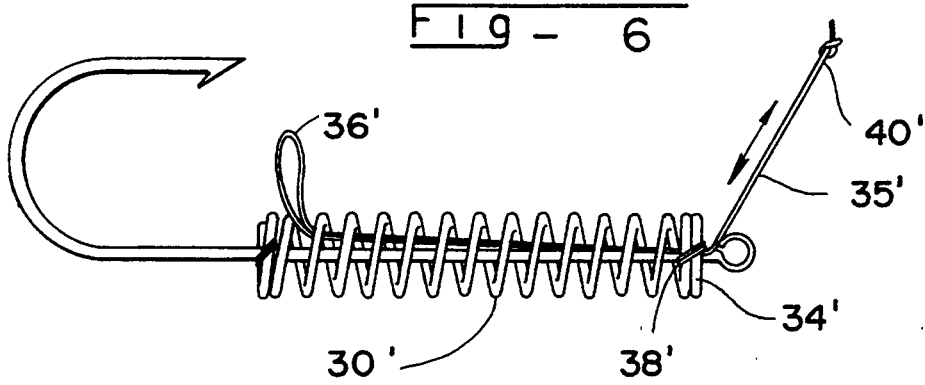

LIVE BAIT FISH HOOK

BACKGROUND OF THE INVENTION

This invention relates to fish hooks and more particularly to a fish hook for use with live bait.

Minnows, crickets, worms and other live bait are difficult to keep alive after being pierced with a hook. After the bait is cast a few times the flesh becomes worn and torn and frequently results in loss of the bait.

Over the years various types of fish hooks have been devised for use with live bait. Although such devices have served the purpose, they have not proved entirely satisfactory. Many known fish hooks do not permit the bait to be positioned immediately adjacent to the barbed hook and fish can steal the bait or take a portion of the bait without being hooked. Other known fish hooks for use with live bait do not position the live bait on the hook to give the hook the characteristic of being weedless. The position of the live bait on known live bait hooks also does not position the bait with respect to the hook in a manner which permits natural movements of the bait during trolling.

Henckler, U.S. Pat. No. 615,170, for example, describes a fish hook for use with live bait which positions the bait perpendicularly with respect to the barbed curved end of the hook. Because of this orientation of the bait with respect to the hook, the bait will not move in a natural manner during trolling. Also the bait is positioned in spaced-apart relationship and on the opposite side of the hook with respect to the barbed end of the hook so that fish can steal the bait or portions of the bait without being hooked.

It is, therefore, an object of the present invention to provide a fish hook for use with live bait.

Another object is to provide a fish hook for use with live bait which enables the bait to be quickly and easily attached to the hook.

A further object of the invention is the provision of a fish hook for use with live bait wherein the bait can be firmly held and positioned against or immediately adjacent to the barbed end of the hook so that fish cannot take the bait without being hooked.

Still another object is to provide a fish hook for use with live bait which enables the bait to be held against the barbed end of the hook and substantially in parallel relationship or in-line with the shank of the hook to give the hook the characteristic of being weedless.

Yet another object of the present invention is the provision of a fish hook for use with live bait which positions the bait so that the bait moves in a natural fashion during trolling.

A still further object is to provide a fish hook for use with live bait which is simple in design and which is inexpensive to manufacture.

Another object is to provide a fish hook for use with live bait which can be used with a variety of live bait.

Still another object is to provide a fish hook for use with live bait which provides for a line surrounding the body of the bait to hold it firmly to the hook.

A further object of the invention is the provision of a fish hook for use with live bait which eliminates piercing of the bait with the hook and which enables the bait to live longer.

Additional objects and advantages of the invention will be set forth in part in the description which follows, and in part will be obvious from the description, or may be learned by practice of the invention. The objects and advantages are realized and attained by means of the instrumentalities and combinations particularly pointed out in the appended claims.

SUMMARY OF THE INVENTION

To achieve these and other objects the present invention provides a fish hook having a shank and a barbed curved end connected to the shank with the barbed end positioned directly opposite a first location on the shank. The fish hook further includes a coil spring axially positioned on the shank and defining first and second ends; the first end of the spring is fixedly attached to the shank at substantially the first location on the shank; and a flexible line is positioned axially within the spring and defines a looped end and first and second ends, the looped end of the line projects through predetermined adjacent coils of the spring substantially at the first location on the shank and the first and second ends of the line are connected to the second end of the spring.

It is to be understood that both the foregoing general description and the following detailed description are exemplary and explanatory but are not restrictive of the invention.

BRIEF DESCRIPTION OF THE DRAWINGS

The accompanying drawings, which are incorporated in and constitute a part of this specification, illustrate examples of preferred embodiments of the invention and, together with the description, serve to explain the principles of the invention.

FIG. 4 is an elevation view of the hook shown in FIG. 1 and illustrating a minnow held by the hook in a second position;

FIG. 5 is an elevation view of the hook shown in FIG. 1 and illustrating a minnow held by the hook in a third position;

FIG. 6 is an elevation view of a second embodiment of the invention;

DESCRIPTION OF THE PREFERRED EMBODIMENTS

Figure 1:
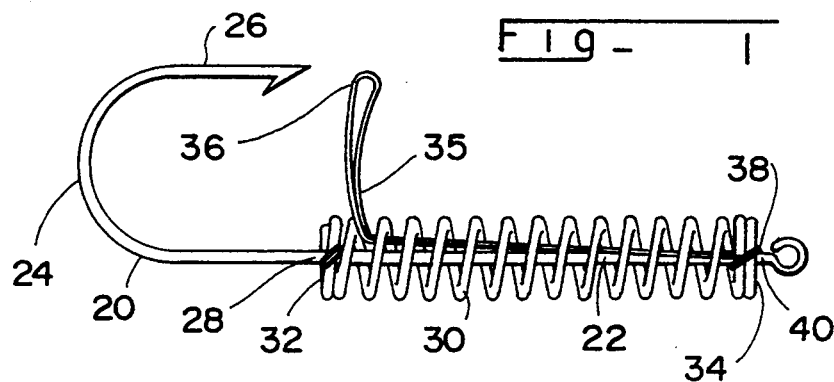
FIG. 1 is an elevation view of a first embodiment of the invention and showing the coil spring in a normal position without any bait held by the hook.

With reference now to the drawings, wherein like reference characters designate like or corresponding parts throughout the several views, there is shown in FIGS. 1-5 a fish hook 20 having a shank 22 and a barbed curved end 24 connected to the shank with the barbed end 26 positioned directly opposite a first location 28 on shank 22.

A coil spring 30 is axially positioned on shank 22 and defines first and second ends 32, 34. First end 32 of spring 30 is fixedly attached to shank 22 at first location 28 by conventional means, such as thread and glue.

A flexible line 35, such as monofilament fishing line, is positioned axially within spring 30 and defines a looped end 36. Flexible line 35 also defines first and second ends 38, 40. Looped end 36 of line 35 projects through adjacent coils of spring 30 substantially at first location 28 on shank 22, and ends 38, 40 of line 35 are connected to second end 34 of spring 30 by conventional means, such as thread and glue.

Figure 7:
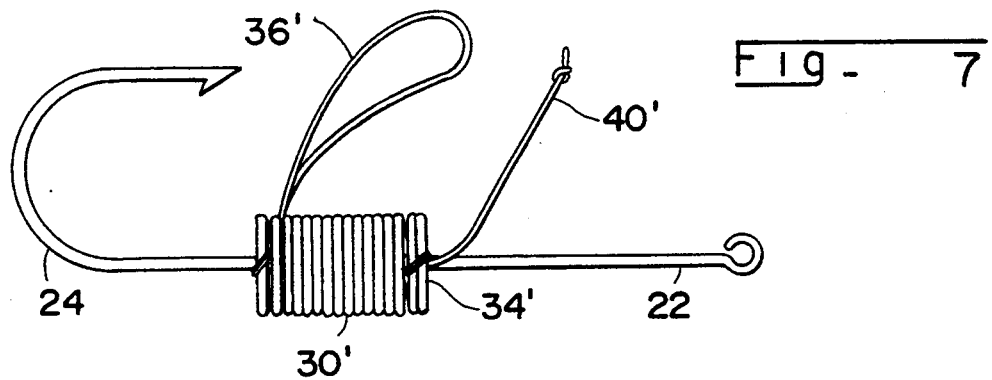
FIG. 7 is an elevation view of the hook embodiment shown in FIG. 6 and illustrating the coil spring in a compressed position to enlarge the looped end of the line.

Each of ends 38, 40 of line 35 are fixedly connected to second end 34 of spring 30 in the embodiment of the invention illustrated in FIGS. 1–5. The invention embodiment shown in FIGS. 6 and 7 provides for first end 38' of line 35' to be fixedly connected to second end 34' of spring 30', and second end 40' of line 35' is slideably, but tightly, connected to second end 34' of spring 30' in a conventional manner, such as by thread and glue. Second end 40' of line 35' is preferably knotted or otherwise enlarged to prevent inadvertent removal of second end 40' from slideable connection with second end 34' of spring 30'. All other elements of the fish hooks shown in FIGS. 1–5 and in FIGS. 6 and 7 are the same in both embodiments.

Figure 8:
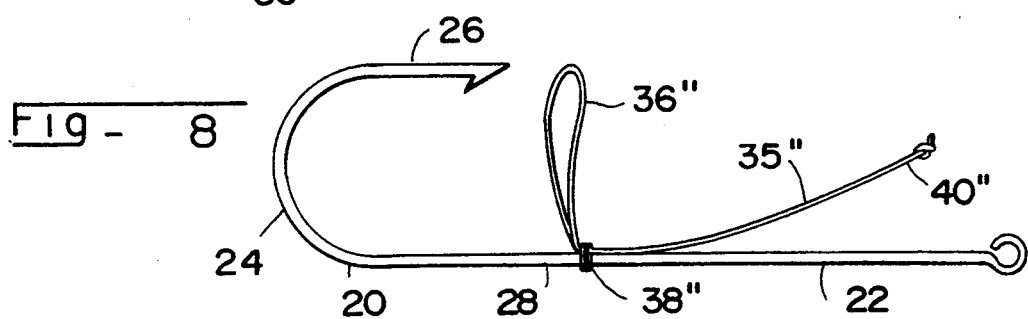
FIG. 8 is an elevation view of a third embodiment of the invention and showing the looped end of the line enlarged to receive a minnow or other bait.
Figure 9:
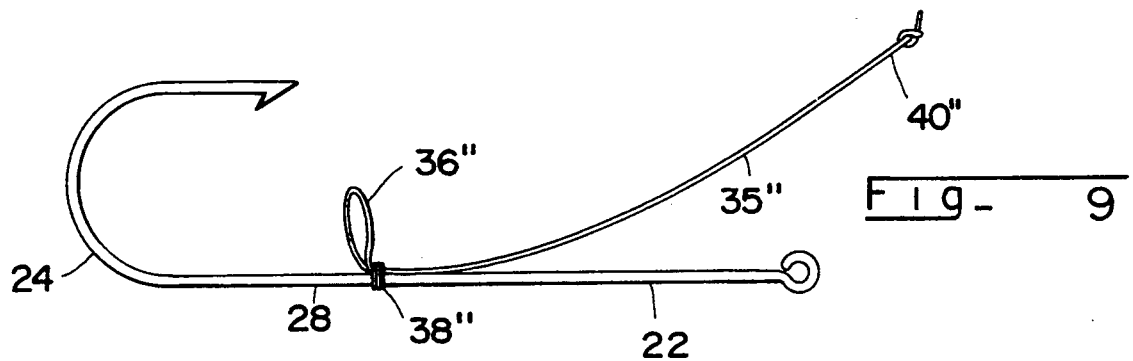
FIG. 9 is an elevation view of the hook embodiment shown in FIG. 8 and illustrating the looped end of the line reduced in size.

Another embodiment of the invention is illustrated in FIGS. 8 and 9. In this embodiment of the invention, fish hook 20, shank 22, barbed curved end 24, barbed end 26 and first location 28 on shank 22 are identical to those corresponding elements in the embodiments of the invention illustrated in FIGS. 1–7. The invention embodiment shown in FIGS. 8 and 9 also includes a line 35" defining a looped end 36" and first and second ends 38", 40". First end 38" is fixedly attached to shank 22 at first location 28 in a conventional manner, such as by thread and glue. Second end 40" is slideably, but tightly, connected to shank 22 at first location 28 e.g. by thread and glue, so that looped end 36" is adjustable in size and is positioned immediately adjacent to first location 28 and to barbed end 26.

Figure 10:
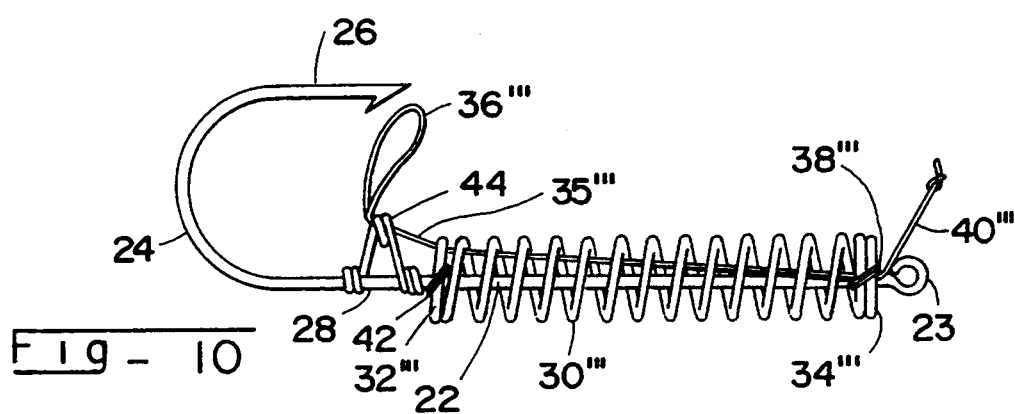
FIG. 10 is an elevation view of a fourth embodiment of the invention.

Another embodiment of the invention is shown in FIG. 10. This embodiment also provides for a fish hook having a shank 22, a barbed curved end 24, a barbed end 26 and a first location 28 on shank 22. The embodiment of the fish hook shown in FIG. 10 further includes a coil spring 30''' axially positioned on shank 22 and defining first and second ends 32''', 34'''. First end 32''' of spring 30''' is fixedly attached to shank 22 at a location 42 on shank 22 which is between a first end 23 of shank 22 and location 28. First end 32''' of spring 30''' is fixedly attached to shank 22 by conventional means, such as thread and glue.

In accordance with this embodiment of the invention, an eyelet 44 is fixedly attached by conventional means to shank 22 at location 28. Eyelet 44 is positioned directly between barbed end 26 and first location 28 on shank 22. A flexible line 35''' is positioned axially within spring 30''' and through eyelet 44. Line 35''' defines a looped end 36''' and first and second ends 38''', 40'''. Looped end 36''' of line 35''' passes through eyelet 44, and ends 38''', 40''' of line 35''' are connected to second end 34''' of spring 30''' by thread and glue.

In the embodiment of the invention shown in FIG. 10, first end 38''' of line 35''' is fixedly connected to second end 34''' of spring 30''' by conventional means, such as thread and glue, and second end 40''' of line 35''' is slideably, but tightly, connected to second end 34''' of spring 30''' by thread and glue. Second end 40''' of line 35''' is preferably knotted or otherwise enlarged to prevent inadvertent removal of second end 40''' from slideable connection with second end 34''' of spring 30'''.

Although not illustrated, it should be understood that this invention contemplates an embodiment similar to that shown in FIG. 10 but wherein both ends of line 35''' are fixedly connected to second end 34''' of spring 30'''.

In operation and use of the embodiment shown in FIGS. 1–5, the index finger and thumb are used to push spring 30 into a compressed position on shank 22. This is accomplished by pushing end 34 of spring 30 with the index finger and thumb toward fixed end 32 of spring 30 to compress the spring. When the spring has been compressed, shank 22 is pinched and spring 30 is held in the compressed position. Compression of spring 30 enlarges loop 36 of flexible line 35 so that the bait can be positioned with the other hand through enlarged loop 36. When the bait is in proper position within enlarged loop 36, the index finger and thumb are released from shank 22 and spring 30 expands to its normal position. This, in turn, reduces the size of looped end 36 and the bait is firmly held by looped end 36 in proper position by the force of spring 30.

Figure 2:
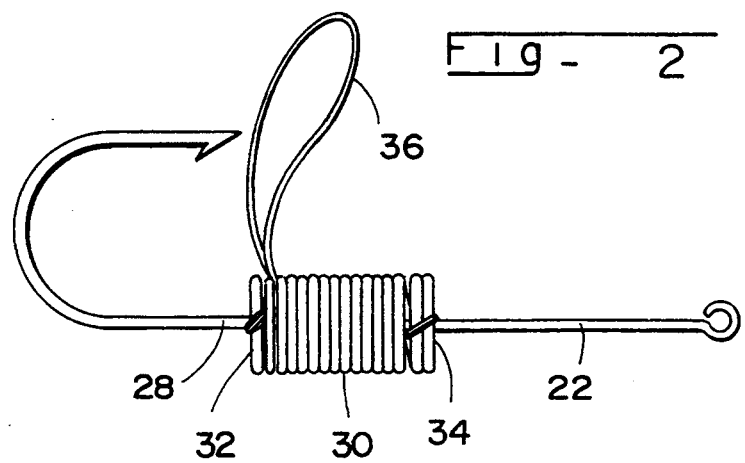
FIG. 2 is an elevation view of the hook shown in FIG. 1 and illustrating the coil spring in a compressed position to enlarge the looped end of the line.
Figure 3:
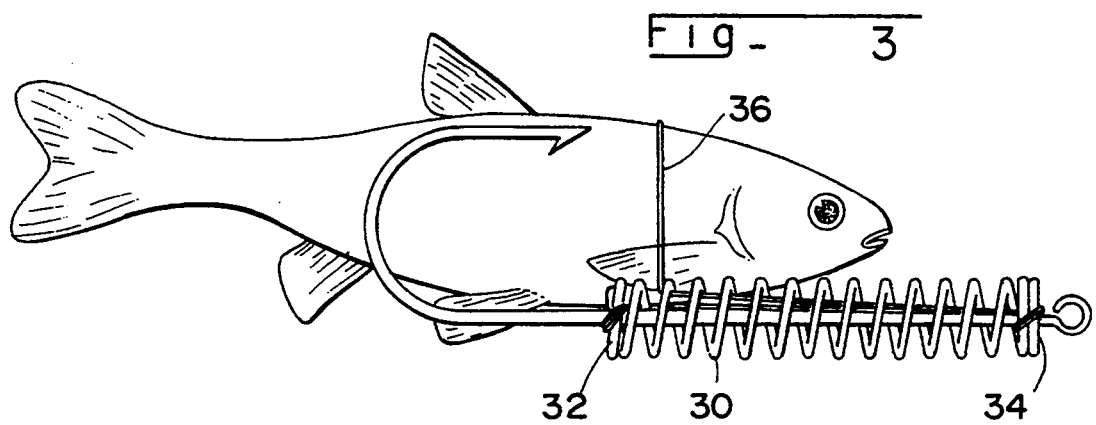
FIG. 3 is an elevation view of the hook shown in FIG. 1 and illustrating a minnow held by the hook in a first position.

FIG. 1 illustrates fish hook 20 in its normal configuration. FIG. 2 shows fish hook 20 with spring 30 compressed and with looped end 36 enlarged to receive the bait. FIG. 3 shows fish hook 20 with the bait firmly held in one proper position by looped end 36. FIG. 4 illustrates an alternative position for the bait on hook 20, and FIG. 5 shows another position for the bait on hook 20.

One significant advantage of the invention is that it enables the bait to be positioned on hook 20 in different relative locations and orientations with respect to barbed end 26 to accommodate different fishing objectives. This versatility of hook 20 is possible because the position of looped end 36 can be quickly and easily changed with respect to barbed end 26. The position of looped end 36, as it passes through adjacent coils of spring 30, can be changed simply by holding looped end 36 in one hand and by holding shank 22 in the other hand and by twisting or rotating shank 22 with respect to looped end 36. Looped end 36 can be quickly positioned as shown in FIGS. 3 and 4 or as shown in FIG. 5 so that the bait can be held in different relative locations and orientations with respect to barbed end 26.

An important feature of the invention is that the position of looped end 36 with respect to shank 22 and with respect to barbed curved end 24 is substantially perpendicular. This is true when looped end 36 is positioned as shown in FIGS. 1–4 and when looped end 36 is positioned as shown in FIG. 5. As a result, when a minnow, for example, is positioned within looped end 36, shank 22 is positioned against the breast of the minnow, and the minnow is oriented in parallel relationship with respect to shank 22. This relationship is shown in FIGS. 3–5. The parallel relationship between shank 22 and the minnow shown in FIGS. 3 and 5 enables the minnow to move naturally through the water during trolling. The natural movements of the minnow attract fish.

This feature of the invention is an improvement over the fish hook described in U.S. Pat. No. 615,170. The position and configuration of guide 3 in Henckler U.S. Pat. No. 615,170 causes the loop holding the bait to be oriented in substantially parallel relationship with respect to shank 1 of the Henckler fish hook. As a result, when a minnow or other bait is positioned through and is held by the loop in the Henckler hook, the minnow is positioned in substantially perpendicular relationship with respect to Henckler's shank 1. Because of this orientation, the minnow will be dragged sideways through the water during trolling in a very unnatural manner. The perpendicular orientation of the minnow with respect to Henckler's hook creates a very unnatural bulldozing affect so that fish are not attracted to the bait.

As shown in FIGS. 3 and 4, the minnow or other bait can be positioned on fish hook 20 so that barbed curved end 24 and barbed end 26 are located in contacting relationship with or immediately adjacent to the body of the bait. This positioning of barbed curved end 24 and barbed end 26 with respect to the bait will give fish hook 20 the characteristic of being weedless. The minnow or other bait acts as an effective weed guard. The perpendicular positioning of bait on the Henckler fish hook and the positioning of the bait on an opposite side of the shank from the barbed end of the Henckler hook does not provide the Henckler fish hook with the weedless capability.

The use of the embodiment shown in FIGS. 6 and 7 is the same as that described with respect to the embodiment shown in FIGS. 1–5, but end 40' of line 35' is slideably attached to end 34' of coil spring 30'. This permits looped end 36' to be further adjusted in size to fit bait of various sizes. Coil spring 30' is still compressed while the bait is positioned within looped end 36', and the force of spring 30' holds the bait tightly in position within looped end 36' when spring 30' is released. End 40' of line 35' is slideably, but tightly, attached to end 34' of spring 30' so that once end 40' is adjusted it will remain in the desired position with respect to end 34'.

FIG. 6 shows this embodiment of the invention in its normal position, and FIG. 7 shows the embodiment with coil spring 30' compressed and with looped end 36' enlarged to receive the bait.

FIGS. 8 and 9 illustrate another embodiment of the invention which does not utilize a coil spring. FIG. 9 shows this embodiment of the invention in its normal configuration, and FIG. 8 shows the embodiment with looped end 36" enlarged to receive the bait.

In use, looped end 36" is enlarged by pulling the loop and by drawing end 40" of line 35" toward shank 22 to enlarge looped end 36". End 40" is slideably, but tightly, attached to shank 22 at location 28 so that once end 40" is adjusted it will remain in the desired position with respect to location 28. The bait is then positioned within enlarged looped end 36", and end 40" is then pulled away from shank 22 to reduce the size of looped end 36" and to tightly engage and hold the bait within looped end 36".

Another embodiment of the invention is shown in FIG. 10. In this embodiment, the normal size of looped end 36''' can be adjusted by movement of end 40''' in slideable relationship with end 34''' of coil spring 30'''. This is done in the same manner as that described with respect to the embodiment shown in FIGS. 6 and 7.

Bait is then inserted through looped end 36''' in the same manner as that described with respect to the embodiment shown in FIGS. 1–5. Specifically, end 34''' of spring 30''' is pushed toward fixed end 32''' of spring 30'''. This enlarges looped end 36''' to the desired size, and the bait is then inserted through enlarged looped end 36'''. End 34''' of spring 30''' is then released and the action of spring 30''' causes the spring to expand and to tighten looped end 36''' around the bait. Eyelet 44 is positioned with respect to shank 22 so that looped end 36''' of line 35''' can normally be oriented perpendicularly with respect to shank 22 and with respect to barbed curved end 24 of the hook. This will enable the bait to be held in alignment with shank 22 and will provide for the advantages previously described with respect to the embodiment shown in FIGS. 1–5. This configuration of eyelet 44 positioned adjacent to barbed end 26 also enables the bait to be held adjacent to barbed end 26 and not removed from and under it, as in Henckler U.S. Pat. No. 615,170.

Although not shown, it should be understood that end 40''' could be fixedly attached to end 34''' of spring 30''', in the same manner as described and illustrated with respect to the embodiment shown in FIGS. 1–5.

This invention describes a fish hook for use with live bait which allows the bait to move in a natural manner during trolling. The live bait can be positioned with the barbed hook contacting or immediately adjacent to the bait so that fish cannot take the bait without being caught by the hook. The fish hook described herein also enables the bait to be positioned to provide the hook with a weedless feature. The bait can be held in a position parallel to the shank of the hook, thus enabling the bait to swim in a natural manner or to be trolled with natural movements. If bait other than minnows are used, the bait is positioned over or adjacent to the barbed hook and not under and removed from the barbed hook so that the bait cannot be taken without the fish being hooked.

Although not described or illustrated, it should be understood that the features of this invention could be used on a treble hook, and hooks of various sizes and configurations can be used.

The invention in its broader aspects is not limited to the specific details shown and described, and departures may be made from such details without departing from the principles of the invention and without sacrificing its chief advantages.

What is claimed is:

1. In a fish hook having a shank and a barbed curved end connected to the shank with the barbed end positioned directly opposite a first location on said shank, the improvement comprising:

a coil spring axially positioned on said shank and defining first and second ends;

said first end of said spring fixedly attached to said shank at substantially said first location on said shank; and a flexible line positioned axially within said spring and defining a looped end and first and second ends, said looped end of said line projecting through and between predetermined adjacent coils of said spring substantially at said first location on said shank and said first and second ends of said line connected to said second end of said spring.

2. A fish hook as in claim 1 wherein each of said first and second ends of said line are fixedly connected to said second end of said spring.

3. A fish hook as in claim 1 wherein said first end of said line is fixedly connected to said second end of said spring and wherein said second end of said line is slideably connected to said second end of said spring.

4. A fish hook as in claim 3 wherein said second end of said line is knotted to prevent removal of said second end of said line from slideable connection with said second end of said spring.

5. In a fish hook having a shank and a barbed curved end connected to a first end of said shank, an eyelet connected to a second end of said shank with the barbed curved end positioned directly opposite a first location on said shank, said first location between said eyelet and said barbed curved end, said shank extending substantially linearly between said eyelet and said barbed curved end, the improvement comprising:

- a line defining a looped end and first and second ends, said looped end positioned between said shank and said barbed curved end, said first end fixedly and directly attached to said shank substantially at said first location and said second end slideably and directly connected to said shank substantially at said first location, whereby said looped end is adjustable in size and is positioned immediately adjacent to said first location and to said barbed end.

6. In a fish hook having a shank defining first and second ends and a barbed curved end element connected to the second end of the shank with the barbed end positioned directly opposite a first location on said shank, the improvement comprising:

- a coil spring axially positioned on said shank and defining first and second ends;
- said first end of said spring fixedly attached to said shank at a location on said shank between said first end of said shank and said first location;
- an eyelet fixedly attached to said shank at substantially said first location on said shank;
- a flexible line positioned axially within said spring and through said eyelet and defining a looped end and first and second ends, said looped end of said line passing through said eyelet and said first and second ends of said line connected to said second end of said spring, said first end of said line fixedly connected to said second end of said spring and said second end of said line slideably connected to said second end of said spring.

7. A fish hook as in claim 6 wherein said second end of said line is knotted to prevent removal of said second end of said line from slideable connection with said second end of said spring.

* * * * *